Sept. 9, 1969  M. N. LEVY ET AL  3,465,827

ON BOARD VEHICLE FIRE PROTECTION SYSTEM

Filed Oct. 20, 1966  2 Sheets-Sheet 1

*INVENTORS.*
MURRAY N. LEVY,
M. S. SHINBAUM &
BY   JOHN S. STRANCE

*Meyer, Tilberry & Body*
ATTORNEYS

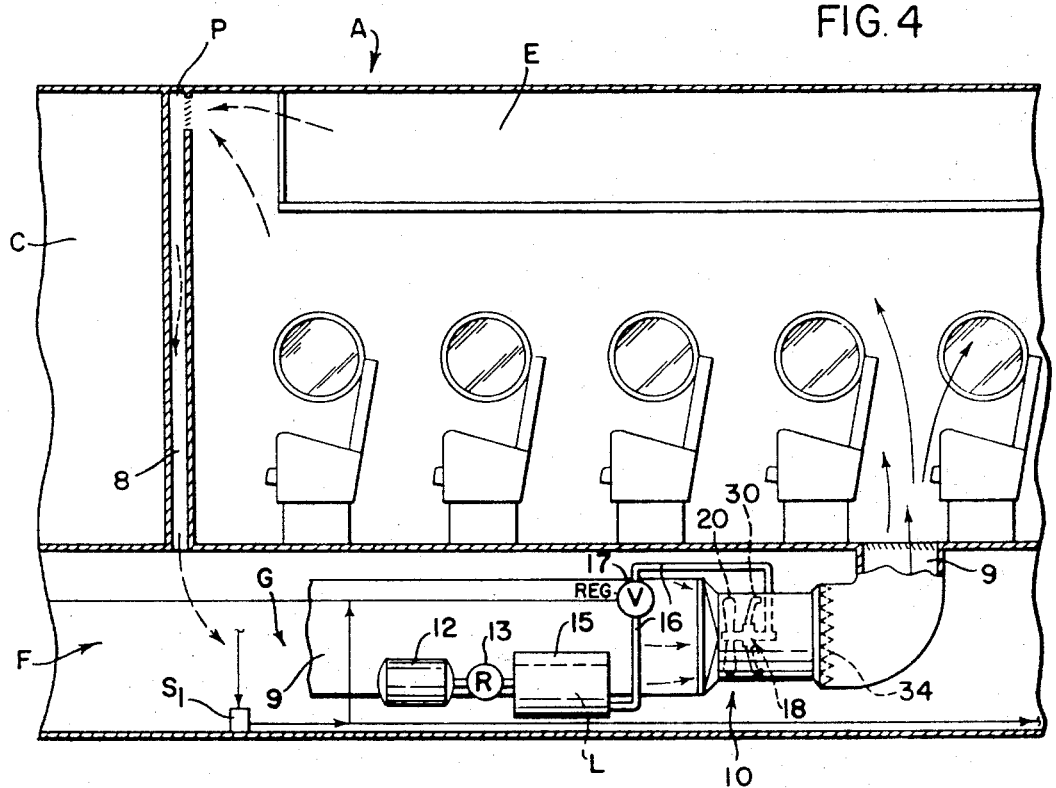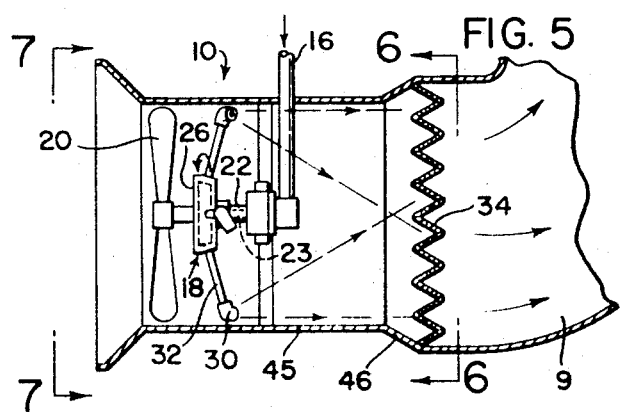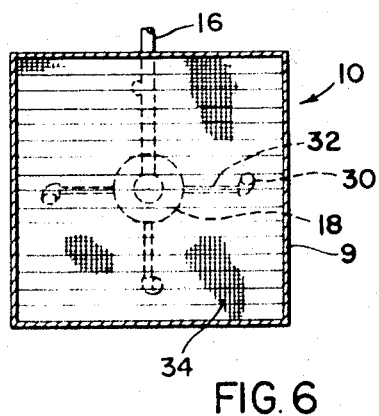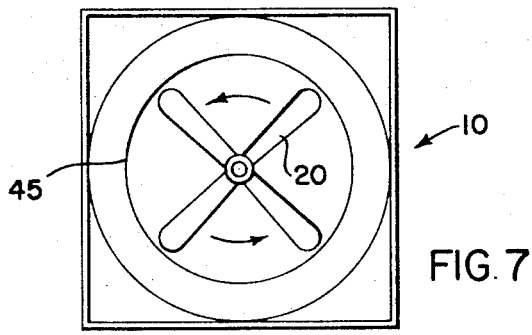

United States Patent Office 3,465,827
Patented Sept. 9, 1969

3,465,827
ON BOARD VEHICLE FIRE PROTECTION SYSTEM
Murray N. Levy, Hatfield, Marvin S. Shinbaum, Springfield, and John S. Strance, Drexel Hill, Pa., assignors to E. W. Bliss Company, Canton, Ohio, a corporation of Delaware
Filed Oct. 20, 1966, Ser. No. 588,159
Int. Cl. A62c 3/08, 35/44
U.S. Cl. 169—2                                   6 Claims

ABSTRACT OF THE DISCLOSURE

A fire protection system especially suited for use on passenger vehic'es. The system includes a foam generating apparatus comprised of an air duct opening into the passenger compartment and having a foam generating perforated means extending across its free passage area. Additionally, fan means and reaction motor means including spray nozzles are provided to introduce a spray of foam solution onto the perforated means and produce an air flow through the duct and perforated means. The fan means and spray nozzles are actuated and supplied with foam solution from a closed, self-contained pressure vessel system including container means for containing a predetermined quantity of foam solution, a pressurized gas sufficient to conduct the solution through the reaction motor means to generate foam on the perforated means.

---

The present invention pertains to the art of fire protection equipment and more particularly to an on board high expansion foam fire protection and life sustaining system for aircraft.

While the invention will be described herein with reference to a commercial type aircraft having an extensive passenger cabin area, it will be appreciated that it has much broader applications and may be equally useful, for example, on trains, buses, ships, or installed for the protection of passengers in any restricted space.

A cabin of a commercial aircraft is usually divided into several compartments, each outfitted with rows of seats for passengers. Largely due to weight considerations, heretofore on board fire protection systems have operated with carbon dioxide as the extinguishing fluid. In an emergency, the system may be manually or automatically triggered to cause carbon dioxide under pressure to be released through a network of nozzles installed in the walls of the cabin. Such systems have been unsatisfactory for several reasons. In the first place, they have not proved effective for the purpose intended, namely, fire extinguishing and smoke suppression. More importantly, such systems do not protect the lives of passengers who, while awaiting emergency evacuation, may be saved from fire but succumb due to the effects of the smoke and the carbon dioxide.

These and other problems are overcome in the present invention which employs high expansion foam as the fire extinguishing medium. High expansion foam as referred to herein is foam having an expansion ratio of at least 50 to 1, i.e., the volume of air present is fifty times the volume of liquid foam solution and especially in life sustaining applications, the expansion ratio is preferably as high as 500 to 1.

In accordance with the invention, a high expansion foam generating system comprises a tubular housing open at each end having a pervious member therein through which air is forced. A liquid foam solution, under pressure, is introduced as a spray into the housing behind the pervious member and distributed evenly thereon by the airstream. The foam solution wets the pervious member substantially uniformly and high expansion foam continuously forms and detaches itself therefrom and emanates into a restricted space which is to be protected. The system is characterized in that a pressure vessel is provided which contains a predetermined quantity of expansible fluid which is used to pressurize a metered amount of liquid foam solution, the latter amount being predicated on the vo'ume of the space to be protected and the expansion ratio employed.

Further in accordance with the invention and particularly where an on board aircraft system is provided for the protection of passengers, the liquid foam solution is contained in a vessel adapted to be automatically or manually pressurized in response to a signal transmitted when conditions endanger the passengers. Also, and particularly in accordance with the life sustaining aspects of the invention, the tubular housing and pervious member are an integral part of an existing venti'ating system having ducts leading into the passenger space, and the breathable air is recirculated to the space trapped in the foam. By placing a hand or handkerchief over the mouth and nose, the air-laden foam can be breathed by the passengers while being rescued.

A main object of the invention is to provide a vehicle on board, foam fire protection system capable of preserving the lives of passengers during the the critical seconds immediately following a crash or other conditions endangering passenger lives.

Another object of the invention is to provide fire protection apparatus for introducing high expansion foam into a confined space containing passengers, which foam serves as a thermal insulating blanket and provides breathable air for the passengers.

Sti'l another object of the invention is to provide an on board, fire protection system for aircraft which, due to the high foam expansions and efficient fire suppression capability, reduces airborne liquids to a minimum and makes for a lesser weight penalty.

Still another object is to provide an on board vehicle fire suppression and life sustaining system which incorporates foam generating means powered by water pressure alone which eliminates the need for auxiliary power supplies such as required for electric motors, or the like, and makes the system independent of the power systems of the vehicle.

These and other objects will be more apparent by referring to the following description and drawings wherein FIGURE 1 is a schematic view showing a commercial aircraft having installed thereon a high expansion foam fire protection system in accordance with the invention;

FIGURE 4 is exemplary of a portion of a cabin area of the aircraft in FIGURE 1 showing a high expansion foam generator installed in the air conditioning or ventilating ducts thereof;

FIGURE 5 is a sectional view of a type of high expansion foam generator as utilized in the preferred embodiment of the invention;

FIGURE 6 is a front view at the outlet end of the generator taken along line 6—6 of FIGURE 5; and FIGURE 7 is a view at the inlet end of the foam generator taken along line 7—7 of FIGURE 5.

Figure 1:
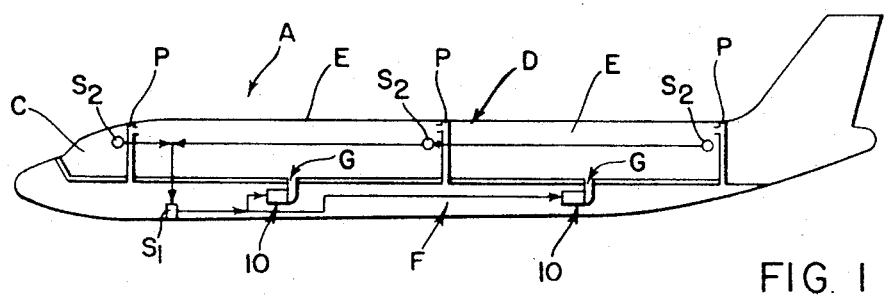

Referring now to the drawings wherein the showings are for the purpose of illustrating a preferred embodiment of the invention only and not for the purpose of limiting the same, FIGURE 1 depicts an aircraft A having a cockpit C and a cabin area D divided by partitions P into a plurality of compartments E, each containing rows of seats for the accommodation of passengers.

In accordance with the invention, an on board fire protection and life sustaining system F is incorporated in the air-conditioning or ventilating system G servicing the compartments E of the aircraft. Referring to FIGURE 4, a portion of one compartment E is shown with its associated ducts 8, 9 of the ventilating system G. Installed in the delivery duct 9 is a high expansion foam generator 10. Although the ducts 8, 9 are for air-conditioning or ventilation, it should be understood that any system of delivery and return ducts for the compartment E would serve equally as well, so long as they have a substantial cross section or otherwise present a free and relatively open area for the delivery of foam to the compartment and the recirculation of air to the generator. It is conceivable also that the aircraft be initially designed with a dual purpose fire protection and air-conditioning system since the accommodation for air-laden foam is already present within the designed feasibility for the aircraft's ventilation system.

The high expansion foam generator 10 includes a vessel 12 containing a pressurized, inert gas, such as nitrogen, connected through a pressure regulator 13 to a tank 15 containing a premixed liquid foam solution L which, in essence, is composed of water and the proper proportions of a foam producing detergent chemical additive. The tank 15 is connected through line 16, which contains a solenoid operated valve 17, to a reaction motor which drives the generator.

Referring to FIGURE 5, and in acocrdance with the preferred embodiment of the invention, the foam generator 10 includes a fan 20 mounted on a rotatable shaft 22, a portion 23 of which is hollow and connects the delivery line 16 to the reaction motor 18 operable for driving the fan 20. The reaction motor 18 includes a hollow rotatable hub 26 which receives foam solution under pressure from line 16 when the valve 17 is opened. A plurality of jet nozzles 30 connect with the hub 26 through arms 32 which support each jet nozzle 30 radially outwardly from the rotational axis of the fan 20. Each nozzle 30 points at an angle to the axis of the fan rotation and each arm 32 is inclined forwardly a slight amount so that under pressure from line 16, each nozzle introduces a spray jet of liquid foam solution into the tubular housing or duct section 45 as indicated by the directional arrows. Since the fan 20 and reaction motor 18 rotate together, the combined thrust of each nozzle 30 imparts rotation to the fan 20 in a counterclockwise direction as indicated in FIGURE 7. It is important to note that the reaction motor 18 is the sole source of power for the fan 20. The generator 10 does not depend on any of the conventional power systems of the aircraft for operation, but has its own self contained source in the form of pressure vessel 12. The angulation of the nozzles 30 with respect to the fan axis is such that there is a substantial downstream force behind the jet spray which, when in the airstream created by rotation of the fan 20, is more or less uniformly distributed. The angle which the nozzles 30 make relative to the fan axis may be varied, but in most cases will be as great as possible while still providing a substantial downstream direction to the jet spray. Also, the greater the length of arms 32, the greater will be the moment arm of the reaction motor 18 for driving the fan 20; however, the point is reached where, in the interest of greater fan velocity, the angulation of the nozzles 30 and the length of the arms 32 will have increased to where the jet spray is greatly influenced by the centrifugal action and therefore it is desirable that the arms 32 be inclined slightly in a forwardly direction so as to counteract this tendency somewhat to insure a more even distribution of the spray.

A downstream screen or pervious member 34 extends across the outlet of the generator 10. As described more in detail hereinafter, when the high expansion foam is generated, the screen 34 becomes soaked or wet by the spray and foam is formed by the flowing of air through the screen 34. The foam continuously detaches itself from the screen and moves outwardly into the duct 9 and then into the compartment E. The higher the expansion ratio, the quicker the compartment E will become filled with foam, however, for some applications wetter foam is used due to its greater heat barrier properties. For purposes of discussion, the term wetter foam will refer to foam having an expansion ratio of between 50 and 500 to 1. Preferably, higher expansion foam having an expansion ratio of in the order of 500–1000 to 1 will be used particularly when a breathable source of air is needed for passengers.

Figure 2:
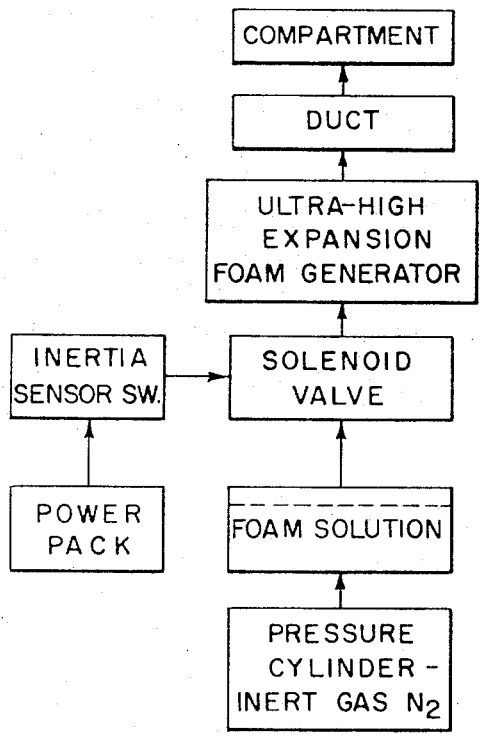
FIGURE 2 is a diagram of the system in FIGURE 1 with the major components represented in block fashion.
Figure 3:
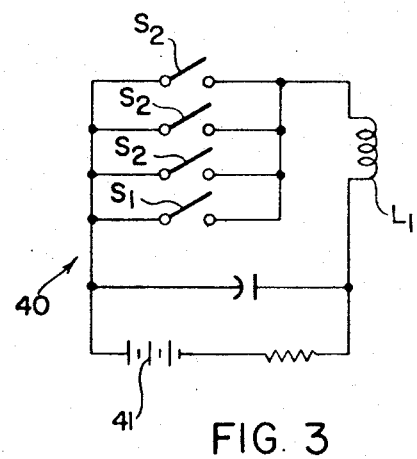
FIGURE 3 is an electrical circuit schematic of the type which may be used to initiate operation of the system.

In accordance with the invention, the foam fire protection system is particularly suitable in providing protection for passengers in aircraft that have either crash landed or in which fire has broken out. If fire breaks out while in the air, the system can be triggered manually at $S_2$ (FIGURE 1) to foam flood the passenger compartment E. In an impending crash landing, the passenger compartments E can also be flooded manually by the pilot or other airline personnel as a matter of course before impact with the ground. Subsequent fire breakout will thus not threaten passengers. In a sudden and unanticipated crash, an inertia sensor $S_1$ is provided for triggering the fire protection system. The rapid deceleration will trigger the system automatically, and while the passengers would still be in peril from the crash, the fact that the compartments E were ruptured or that the electrical power of the aircraft was shut off, would not prevent the operation of the individual units 10 of the fire protection system so as to protect the survivors of the crash from succumbing to fire and smoke. Moreover, it is also within the concept of the invention, that each foam generator 10 may be completely independent of the next as well as of the plane's electrical or other power source although for purposes of description, the system is described herein as integrated. Referring now to FIGURES 2 and 3, a power pack 40 includes stations $S_1$ and $S_2$, having switches operable to connect a battery 41 to a load $L_1$ which represents the coil of the solenoid valve 17. $S_1$ is an inertia sensor which is set to a value higher than decelerations commonly encountered in flight, landing, etc., but lower than a threshhold value endangering passengers lives which would be experienced only upon crash. In addition, one or more manual stations $S_2$ are positioned in the cockpit C and compartments E where they may be operated by the pilot or crew.

In operation, when the fire protection system F is triggered, the power pack 40 energizes the solenoid coil $L_1$ of normally closed valves 17 of each generator 10. Since the foam solution L in tanks 15 is continuously pressurized by the high pressure gas in tanks 12, opening the solenoid valve 17 immediately produces a flow of foam solution into the reaction motor 18. Under pressure, the reaction motor 18 now rotates fan 20 while simultaneously the nozzles 30 introduce the liquid foam solution spray into the airstream wetting the downstream screen 34. The quantity of foam generated is largely a function of the total area of the screen 34 within certain velocity limits; that is, if the velocity of the airstream is too high, bubbles will not bridge across the foam forming perforations therein and blown out regions will result in which no foam is generated. If blown out regions result a certain percentage of the foam solution will merely drain off of the screen 34. The maximum foam capacity, therefore, is a balance of various factors, but an important part is the shape of the housing within which the fan 20 is installed. As noted in FIGURE 5, the duct 9 has a constant diameter portion 45 joined by an increasing cross sectional area portion 46. As a result, a significant portion of the velocity head of the airstream is converted into a dynamic pressure head immediately behind the screen 34. Also advantageous is the fact that by merely increasing the pressure of the foam solution, a coordinated action occurs in which the fan speed increases automatically further increasing the foam production consistent with the increased volume of spray introduced. While a particular reaction motor 18 is shown in FIGURE 5, it will be understood that various arrangements are possible and are, in fact, disclosed in a copending United States patent application, Ser. No. 572,851 filed Aug. 16, 1966, now abandoned, in the name of Joseph R. Winslow, which application is assigned to the assignee of the present invention. Moreover, while that application describes and claims various embodiments of high expansion foam generators utilizing reaction motor powered fans, it should also be appreciated that the present invention is not limited to generators where the air is moved by a fan, but also contemplates a generator of the type disclosed and claimed in United States patent application, Ser. No. 560,985 filed June 27, 1966, now abandoned, in the name of James F. O'Regan et al., which is also assigned to the assignee of this invention. In that application, instead of a fan an array of jets are directed into a restricted portion near the inlet of a barrel so as to induce a flow of air through the barrel sufficient to form high expansion foam. What is important in the present invention is the fact that the air flow is created by means capable of power independently of the aircraft unlike electrical motors or the like, which would be subject to failure at the very instant when most needed in the applications intended.

With the release of the foam solution L, whether it be by impact caused by inertia sensors or manually at one of the stations $S_2$, foam will emanate from the screen 34 and will fill the compartments E in a matter of seconds. The air in the compartments will be displaced through the return ducts 8 by the foam as depicted in FIGURE 4, and returned to the generators 10 where it goes into the production of foam. As shown, the individual generators 10 are connected for simultaneous operation and are installed directly in the ventilating duct 9 so that the foam rises into the passenger compartment E through ventilators in the floor. The only requirement for the placement of the units, however, is that they be placed in sufficient numbers to provide foam to fill the cabin in seconds and be located in areas containing breathable air with suitable ventilation to prevent back pressure against the foam. Assuming a cabin volume of 6500 cubic feet, the weight of foam solution L required to completely fill the compartment E with high expansion foam may lie somewhere between 600 and 4000 pounds, depending on the expansion ratio although obviously a greater weight penalty is paid where wetter foam is used in view of the larger volume of liquid required. It is a provision of the invention, therefore, that a metered amount of foam solution L be used in accordance with the volume of the enclosed space to be protected and the expansion ratio employed. By enclosed or restricted space is meant space enclosed on at least three sides. The characteristic of high expansion foam is such that it will move away from the screen 34 in massive quantities freely traveling around corners and down passageways so long as the forward path is relatively free and open. Generally, the smallest cross sectional area in the foam path should not be less than that of screen 34. It is also within the scope of this invention that a single, large capacity generator may be installed in the wing or tail area of the aircraft with ducts leading out from such common foam sources instead of employing numerous small generators.

In addition to serving as a heat barrier for the passengers, the foam blocks out smoke and fume from the passenger area. Moreover, the nontoxic, air-laden foam provides breathing air for the passengers without the need for special masks or equipment so as to preserve lives in the critical seconds immediately after a crash and before rescue arrives. Also in contrast with the prior art carbon dioxide system, the passenger's vision is reduced in the foam blanket but he is still able to discern emergency lights over exits and the other human senses remain relatively unaffected which tends to reduce panic.

Having thus described a preferred embodiment of the invention, it will be appreciated that various modifications and changes can be made by persons skilled in the art without departing from the spirit of the invention.

Having thus described our invention, we claim:

1. A fire protection apparatus for generating high expansion foam for the suppression of fire in an enclosed space comprising:
   a duct opening into the enclosed space which is of sufficient size to allow the free passage of substantial volumes of air therethrough;
   a pervious member positioned in the duct and of sufficient size to substantially cover the cross-sectional area thereof;
   a fan means for conducting air through said duct;
   a reaction motor means for driving said fan means and including a pair of reaction nozzles for spraying foam solution on said pervious member; and,
   a self-contained, closed pressure vessel system connected through fluid conduit and valve means with said reaction motor means, said pressure vessel system including means for containing a predetermined quantity of liquid foam solution and a quantity of pressurized gas sufficient to discharge said liquid foam solution through said pipe and valve means to reaction motor means and nozzles at a pressure sufficient to drive said fan means at a velocity required for the creation of high expansion foam on said pervious member.

2. A fire protection apparatus as defined in claim 1 wherein said means for containing includes a first container for containing said foam solution and a pressure vessel for containing said pressurized gas, said first container and said pressure vessel being connected through pressure regulating means.

3. A fire protection apparatus as defined in claim 1 wherein means are provided for opening said valve means in response to detection of a predetermined condition.

4. A fire protection apparatus as defined in claim 1 wherein the duct has an inlet opening up stream of said fan means at an elevation above said opening into the enclosed space.

5. A fire protection system for generating high expansion foam for the suppression of fire in an enclosed space comprising
   a duct opening into the enclosed space which is of sufficient size to allow the free passage of substantial volumes of air therethrough,
   a pervious member positioned in the duct of sufficient size to substantially cover the cross-sectional area thereof,
   a closed container having a predetermined quantity of liquid foam solution therein, the volumes of solution being determined by the volumes of the space to be protected and the expansion ratio of the foam,
   a pressure vessel connected to said container and containing a pressurized quantity of expansible fluid sufficient to pressurize the foam solution and exhaust it from its container to said fan means and spray means,
   spray means connectable to said container for introducing a spray of foam solution substantially evenly distributed in the airstream for wetting the pervious member,
   a body of high expansion foam adapted to be formed continuously on the pervious member at the predetermined expansion ratio for introduction into the enclosed space; and,
   the duct further including an inlet at an elevated position in said enclosed space and the foam being formed from the available air displaced by it from the space.

6. In combination with a passenger vehicle, a fire protection system for generating high expansion foam for the suppression of fire in an enclosed passenger compartment of said vehicle comprising a duct opening into the enclosed passenger compartment which is of sufficient size to allow the free passage of substantial volumes of air therethrough, a screen positioned in the duct of sufficient size to substantially cover the cross-sectional area thereof, a closed container having a predetermined quantity of liquid foam solution therein, the volume of solution being determined by the volumes of the space to be protected and the expansion ratio of the foam, a pressure vessel connected to said container and containing a quantity of expansible fluid sufficient to pressurize the foam solution and exhaust it from its container, spray means connectable to said container for introducing a spray of foam solution substantially evenly distributed in the airstream for wetting the screen and a body of high expansion foam adapted to be formed continuously on the screen at the predetermined expansion ratio for introductions into the passenger compartment; and, the duct further including an inlet at an elevated position in said passenger compartment and the foam is formed from the available air therein.

References Cited

UNITED STATES PATENTS

| | | | |
|---|---|---|---|
| 2,990,165 | 6/1961 | Joseph | 169—15 X |
| 3,356,148 | 12/1967 | Jamison | 169—15 |
| 3,142,340 | 7/1964 | Jamison | 169—15 |
| 3,303,886 | 2/1967 | Tatersall et al. | 169—16 |

M. HENSON WOOD, JR., Primary Examiner

M. Y. MAR, Assistant Examiner